US008527689B2

(12) United States Patent  
Amitay et al.

(10) Patent No.: US 8,527,689 B2  
(45) Date of Patent: Sep. 3, 2013

(54) MULTI-DESTINATION DIRECT MEMORY ACCESS TRANSFER

(75) Inventors: Amichay Amitay, Hod Hasharon (IL); Leonid Dubrovin, Karney Shomron (IL); Alexander Rabinovitch, Kfar Yona (IL)

(73) Assignee: LSI Corporation, San Jose, CA (US)

( * ) Notice: Subject to any disclaimer, the term of this patent is extended or adjusted under 35 U.S.C. 154(b) by 247 days.

(21) Appl. No.: 12/914,070

(22) Filed: Oct. 28, 2010

(65) Prior Publication Data

US 2012/0110232 A1 May 3, 2012

(51) Int. Cl.
*G06F 13/28* (2006.01)
*G06F 13/36* (2006.01)
*G06F 13/00* (2006.01)
*G06T 1/00* (2006.01)
*G06T 1/60* (2006.01)

(52) U.S. Cl.
USPC ............. 710/308; 710/22; 710/311; 345/501; 345/530; 345/537

(58) Field of Classification Search
USPC ................. 710/22–24, 28, 74, 306, 308, 311; 345/501, 519, 520, 530, 531, 536–538
See application file for complete search history.

(56) References Cited

U.S. PATENT DOCUMENTS

| 5,513,374 | A * | 4/1996 | Baji ................................ 710/26 |
| 6,151,641 | A * | 11/2000 | Herbert ........................... 710/22 |
| 6,795,874 | B2 | 9/2004 | Martin et al. .................... 710/20 |
| 7,304,646 | B2 * | 12/2007 | Iwata ............................ 345/537 |
| 2004/0064600 | A1 * | 4/2004 | Lee et al. ........................ 710/22 |
| 2006/0075067 | A1 * | 4/2006 | Blackmore et al. ........... 709/217 |
| 2007/0162647 | A1 * | 7/2007 | Tousek ............................ 710/22 |

OTHER PUBLICATIONS

'Modified'. "The American Heritage® Dictionary of the English Language". Fourth Edition. 2003. Houghton Mifflin Company. Retrieved from Internet Mar. 8, 2013. < http://www.thefreedictionary.com/modified>.*

* cited by examiner

*Primary Examiner* — Thomas J Cleary
(74) *Attorney, Agent, or Firm* — Christopher P. Maiorana, PC

(57) ABSTRACT

An apparatus generally including an internal memory and a direct memory access controller is disclosed. The direct memory access controller may be configured to (i) read first information from an external memory across an external bus, (ii) generate second information by processing the first information, (iii) write the first information across an internal bus to a first location in the internal memory during a direct memory access transfer and (iv) write the second information across the internal bus to a second location in the internal memory during the direct memory access transfer. The second location may be different from the first location.

20 Claims, 6 Drawing Sheets

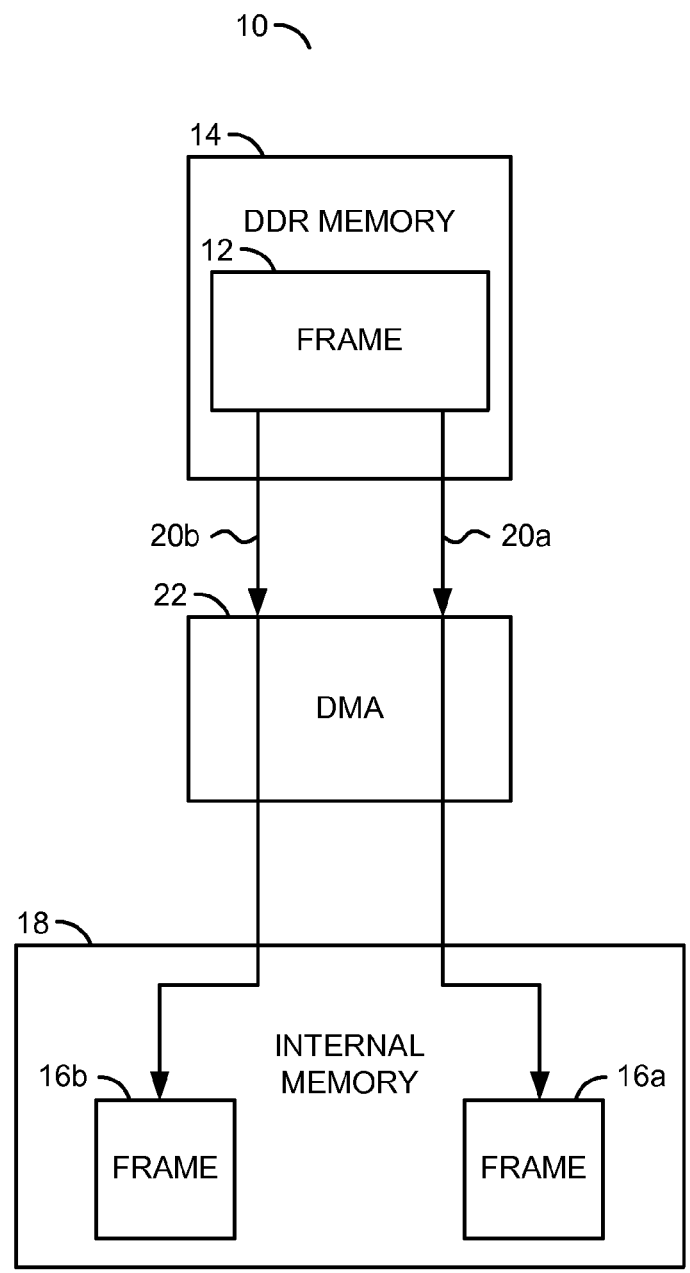
(CONVENTIONAL)
FIG. 1

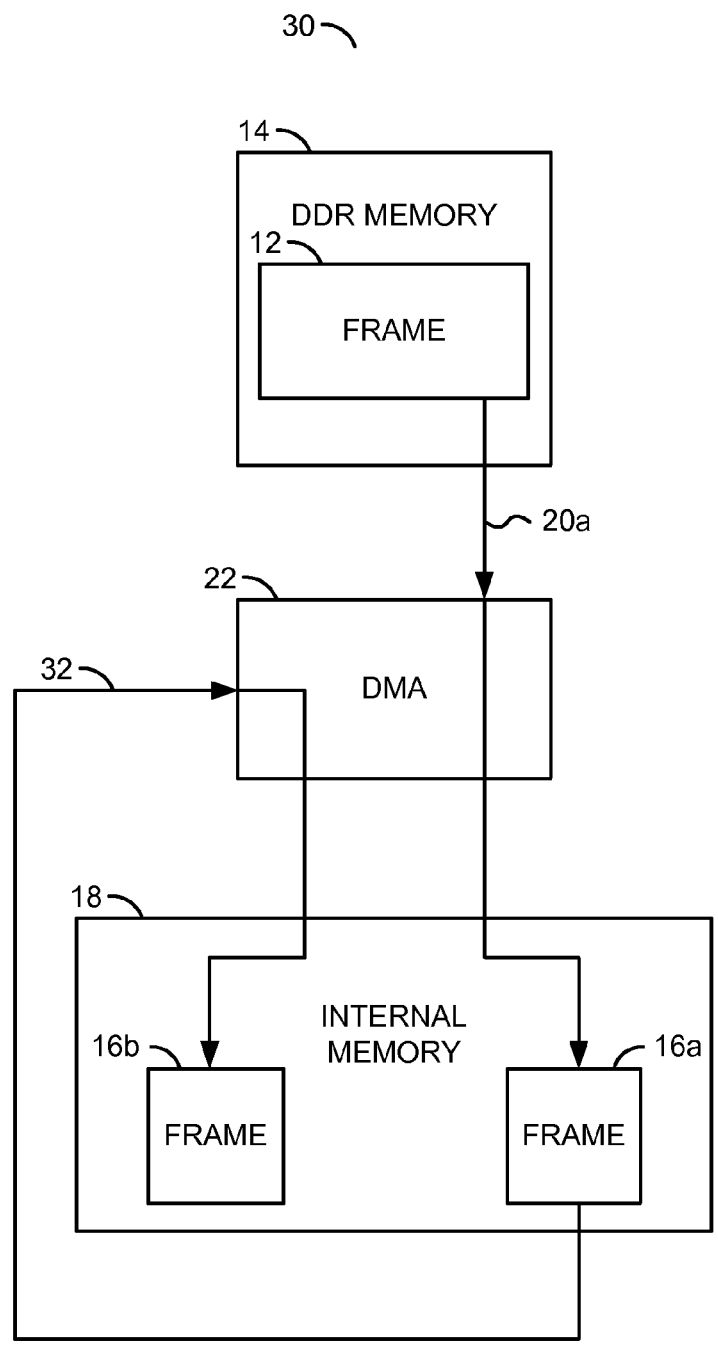
(CONVENTIONAL)
FIG. 2

MULTI-DESTINATION DIRECT MEMORY ACCESS TRANSFER

FIELD OF THE INVENTION

The present invention relates to direct memory access control generally and, more particularly, to a method and/or apparatus for implementing a multi-destination direct memory access transfer.

BACKGROUND OF THE INVENTION

Video processing, video coding, and graphics application technologies are markets that have been growing substantially over the last few years. The technologies are combined into many applications and are widely used. Video data bandwidth usage is high especially since video resolution enabled on televisions and personal computer monitors keep increasing all the time. For example, 1080 progressive (1080P) resolution is available now in most new televisions. An associated bandwidth for a simple display of 1080P video is about 3 gigabits per second. Digital signal processors performing video coding, video processing or graphics applications are sensitive to memory bandwidth criteria. The memory bandwidth criteria limit the performance of many systems rather than processing power. Therefore, memory bandwidth optimization is useful in order to enable such applications.

Many video processing techniques utilize several copies of a frame at several locations within a memory. Three-dimensional (3D) graphics applications also perform texture mapping over 3D scenes by considering the resolution from which to extract the current level of detail specified after a 3D warping. Furthermore, scalable Video Coding (SVC) uses multi-resolution representations of the video. The multi-resolution representations enable both error resilient transmission of the video and an ability to personalize video experience according to the edge device capabilities and type of service (i.e., standard or prime services).

Referring to FIG. 1, a block diagram of a conventional method 10 for creating multi-destination copies is shown. In the method 10, a frame stored at a location 12 is read directly from a memory 14 to two or more locations 16a-16b in another memory 18 using two independent transfers 20a-20b. The transfers 20a-20b are controlled by a direct memory access engine 22. A problem with the method 10 is that a bandwidth cost for the memory 14 is high, the total transfer is typically slow and a bottleneck is created for the application relying on the frames in the memory 18. In the method 10, the bandwidth involved is two frame reads from the memory 14 and two frames writes into the memory 18.

Referring to FIG. 2, a block diagram of another conventional method 30 for creating multi-destination copies is shown. In the method 30, the frame at the location 12 is read from the memory 14 to the location 16a using the transfer 20a. The direct memory access engine 22 then copies the frame from the location 16a to the location 16b in another transfer 32. The lack of the transfer 20b decreases the bandwidth consumption of the memory 14 compared with the method 10. However, method 30 still causes some issues. In particular, congestion is created in the memory 18, especially if both copies of the frame in the memory 18 are to be accessed temporally proximate each other. A synchronization issue is also created due to the transfer 20a writing to the location 16a while the transfer 32 tries to read from the location 16a. Furthermore, the internal memory bandwidth of the memory 18 is increased due to the added read from the location 16a at the start of the transfer 32.

SUMMARY OF THE INVENTION

The present invention concerns an apparatus generally including an internal memory and a direct memory access controller. The direct memory access controller may be configured to (i) read first information from an external memory across an external bus, (ii) generate second information by processing the first information, (iii) write the first information across an internal bus to a first location in the internal memory during a direct memory access transfer and (iv) write the second information across the internal bus to a second location in the internal memory during the direct memory access transfer. The second location may be different from the first location.

The objects, features and advantages of the present invention include providing a method and/or apparatus for implementing a multi-destination direct memory access transfer that may (i) read data from a source and store the data in several destinations, (ii) decimate the data before storing in one or more of the destinations, (iii) interpolate the data before storing in one or more of the destinations, (iv) filter the data before storing in one or more of the destinations, (v) reduce a bandwidth utilization of the source, (vi) maintain bandwidth utilization of the destinations, (vii) avoid congestion at the destinations, and/or (viii) free digital signal processing power from the task of making multiple copies of the data.

BRIEF DESCRIPTION OF THE DRAWINGS

These and other objects, features and advantages of the present invention will be apparent from the following detailed description and the appended claims and drawings in which:

FIG. 1 is a block diagram of a conventional method for creating multi-destination copies;

FIG. 2 is a block diagram of another conventional method for creating multi-destination copies;

DETAILED DESCRIPTION OF THE PREFERRED EMBODIMENTS

Figure 3:
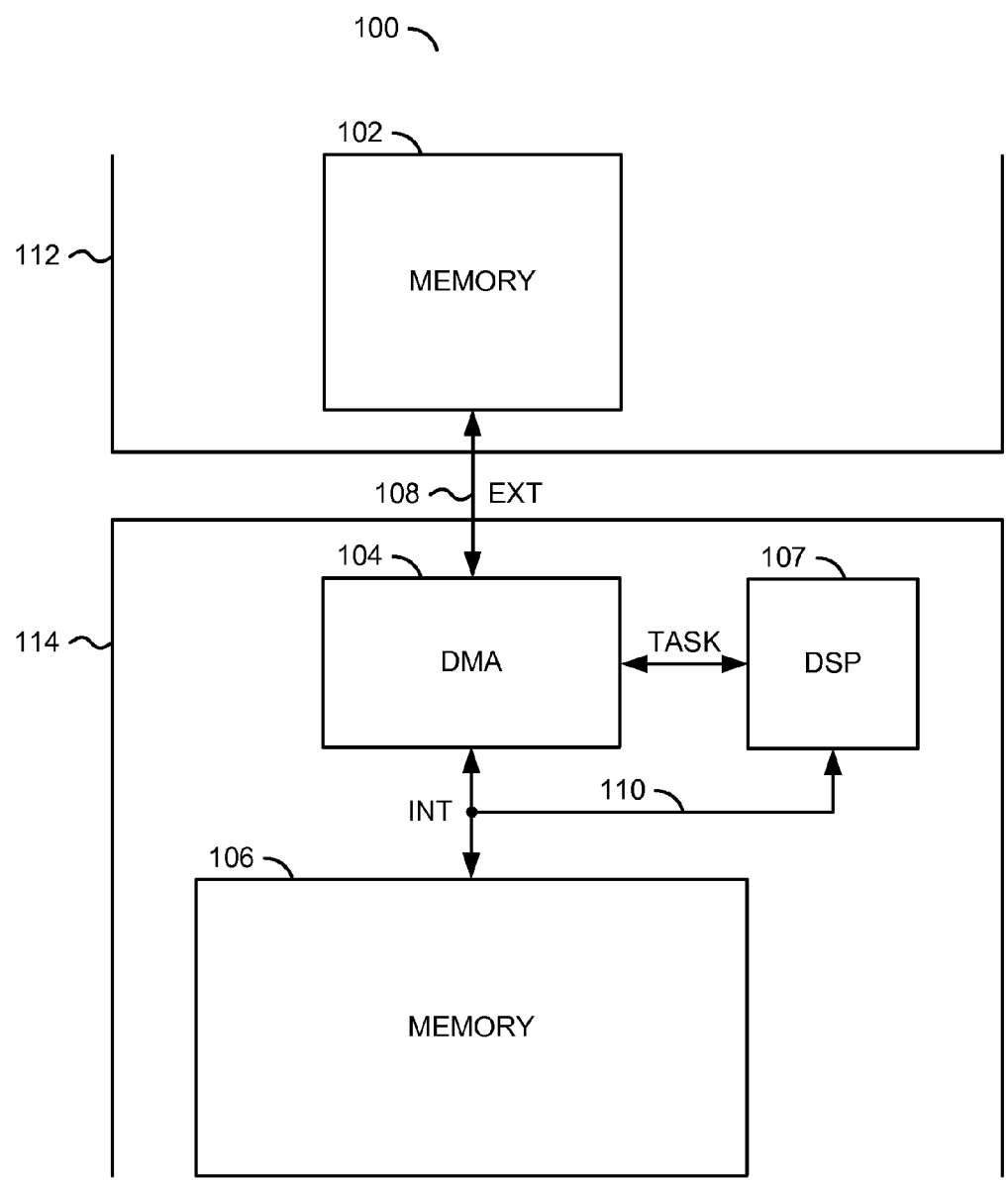
FIG. 3 is a block diagram of an apparatus in accordance with a preferred embodiment of the present invention.

Referring to FIG. 3, a block diagram of an apparatus 100 is shown in accordance with a preferred embodiment of the present invention. The apparatus (or device or circuit) 100 generally comprises a circuit (or module) 102, a circuit (or module) 104, a circuit (or module) 106, a circuit (or module) 107, a circuit (or bus) 108 and a circuit (or bus) 110. The circuits 102 to 110 may represent modules and/or blocks that may be implemented as hardware, firmware, software, a combination of hardware, firmware and/or software, or other implementations.

A signal (e.g., EXT) may be conveyed by the bus 108 between the circuit 102 and the circuit 104. In some embodiments, the signal EXT may be a bidirectional signal. A signal (e.g., INT) may be conveyed by the bus 110 between the circuit 104, the circuit 106 and the circuit 107. In some embodiments, the signal INT may be a bidirectional signal. A signal (e.g., TASK) may be presented from the circuit 107 to the circuit 104.

The circuit 102 may be fabricated in (on) a die (or chip) 112. In some embodiments, the circuits 104, 106, 107 and 110 may be fabricated in (on) another die (or chip) 114. In other embodiments, all of the circuits 102-110 may be fabricated in (on) the same die (e.g., 112 or 114).

The circuit 102 may implement an external memory circuit. The circuit 102 is generally operational to store data presented to and received from the circuit 104 via the signal EXT on the bus 108. In some embodiments, the circuit 102 may be implemented as a double data rate (DDR) memory. Other memory technologies may be implemented to meet the criteria of a particular application. Since the circuit 102 may be fabricated on the die 112 apart from the die 114, the circuit 102 may be considered external to the circuits of the die 114.

The circuit 104 may be implemented as a Direct Memory Access (DMA) controller circuit. The circuit 104 may be operational to transfer the data between the circuit 102 and the circuit 106 in one or more DMA transfer operations. Some transfers may be from a single location in a source circuit (e.g., 102) to a single location in a destination circuit (e.g., 106). Other transfers may be from a single location in the source circuit to two or more locations in the destination circuit.

Where a DMA transfer involves multiple destinations, the circuit 104 may be further operational to process the data routed to at least one of the locations in the destination circuit. Processing may include, but is not limited to, decimation, interpolation, filtering and/or deinterlacing of the data. For example, where the data is an image, picture, frame or field from a video sequence or still picture, the decimation may include removal of every other pixel horizontally and/or vertically. Other decimation techniques may be implemented to meet the criteria of a particular application. As a result, an image may be copied from the circuit 102 to a given location in the circuit 106 at full resolution while another smaller version of the image may be written to another location in the circuit 106.

Where the processing is an interpolation, multiple copies of an image may be copied from the circuit 102 to multiple locations in the circuit 106. Each copy in the circuit 106 may have a different size (or resolution). For example, a standard video frame (e.g., 720 by 480 pixels) may be copied from the circuit 102 to a particular location in the circuit 106 without interpolation. Another copy of the standard video frame may be interpolated to a high resolution (e.g., 1920 by 1080 pixels) and stored at a different location in the circuit 106. Furthermore, the processing may include conversion of the interlaced fields into progressive frames. Therefore, the circuit 106 may contain both standard and high-definition frames that are eventually presented to a standard and/or high-definition displays and/or recording devices.

Where the process is filtering, a lowpass filter may be implemented to smooth the data (e.g., smooth an image of a still picture or field/frame of video. The lowpass filtering may also be designed to decimate pictures/fields/frames. Highpass filtering may also be implemented to sharpen details in the pictures/fields/frames. Other types of filtering may be implemented to meet the criteria of a particular application.

The circuit 106 may implement one or more internal memory circuits. The circuit 106 is generally operational to store one or more copies of the data received from and/or present data to the circuit 104 in the signal INT. In some embodiments, the circuit 106 my implement a static random access memory. In other embodiments, the circuit 106 may implement a dynamic random access memory. Other memory technologies may be implemented to meet the criteria of a particular application. Since the circuit 106 may be fabricated on the same die 114 as the circuit 104, the circuit 106 may be considered an internal memory.

The circuit 107 may implement a Digital Signal Processor (DSP) circuit. The circuit 107 is generally operational to process the data stored in the circuit 106. The processing may include, but is not limited to video processing, graphics processing, audio processing and still picture processing. Access to the circuit 106 may be via bus 110. The circuit 107 may also be operational to configure the circuit 104 to perform one or more DMA transfer operations. Configuring may be achieved by loading a source address and one or more destination addresses into the circuit 104 via the signal TASK.

The circuit 108 may implement an external memory bus circuit. The circuit 108 is generally operational to achieve control of the circuit 102 and transfer data to and from the circuit 102. Where the circuit 102 is fabricated on a die separate from the circuit 104, line drivers, electrostatic discharge circuitry, termination circuitry and the like may be implemented for the circuit 108. In some embodiments, the circuit 108 is a point-to-point bus to connect to a single circuit 102. In other embodiments, the circuit 108 may implement a multi-drop bus to connect to multiple circuits 102. Other inter-chip bus technologies may be implemented to meet the criteria of a particular application.

The circuit 110 may implement an internal memory bus circuit. The circuit 110 is generally operational to exchange data between the circuit 104 and the circuit 106 and between the circuit 106 and the circuit 107. In some embodiments, the circuit 110 may be a multi-drop bus. Other intra-chip bus technologies may be implemented to meet the criteria of a particular application.

Figure 4:
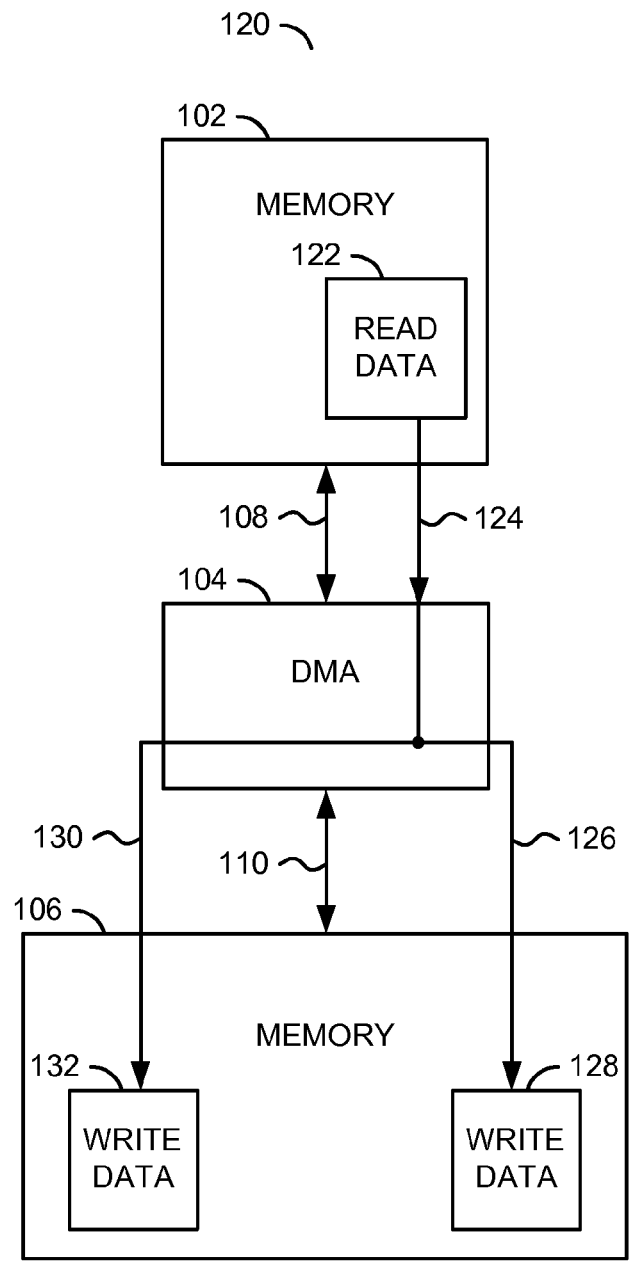
FIG. 4 is a functional flow diagram of an example method for a multi-destination transfer.

Referring to FIG. 4, a functional flow diagram of an example method 120 for a multi-destination transfer is shown. The method (or process) 120 generally comprises a step (or operation) 122, a step (or operation) 124, a step (or operation) 126, a step (or operation) 128, a step (or operation) 130 and a step (or operation) 132. The steps 122 to 132 may represent modules and/or blocks that may be implemented as hardware, firmware, software, a combination of hardware, firmware and/or software, or other implementations. The method 120 may be performed by the apparatus 100.

In the step 122, data (e.g., a frame) may be stored in the circuit 102. The data may be transferred (e.g., read) from the circuit 102 to the circuit 104 in the step 124. The transfer may take place on the bus 108. Step 124 may form a part of a single DMA transfer operation. In the step 126, the circuit 104 may transfer (e.g., write) the data to the circuit 106 via the bus 110. The circuit 106 may store the data in the step 128 at a given location. The transfer of step 126 and storage of step 128 may also form parts of the single DMA transfer operation. The data may undergo another transfer (e.g., write) from the circuit 104 to the circuit 106 in the step 130. The transfer of step 130 may also take place on the bus 110. In the step 132, the data may be stored in the circuit 106 at another location. The transfer of step 130 and the storage of step 132 may form parts of the single DMA transfer. Steps 130 and 132 may be performed in parallel to steps 126 and 128. Although the method 120 illustrates two destinations for the data in the circuit 106, other embodiments may write the data to three or more destinations using the same technique.

Figure 5:
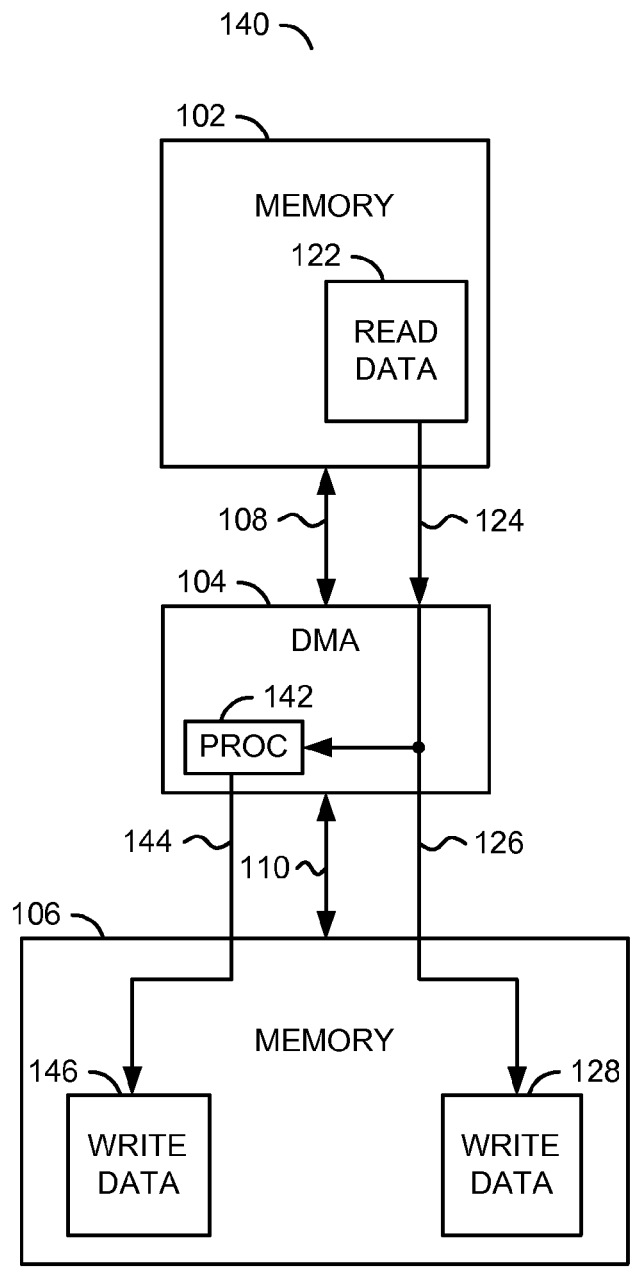
FIG. 5 is a functional block diagram of an example method for a processed, multi-destination transfer.

Referring to FIG. 5, a functional block diagram of an example method 140 for a processed, multi-destination transfer is shown. The method (or process) 140 generally comprises the step 122, the step 124, the step 126, the step 128, a step (or operation) 142, a step (or operation) 144 and a step (or operation) 146. The steps 122 to 146 may represent modules and/or blocks that may be implemented as hardware, firmware, software, a combination of hardware, firmware and/or software, or other implementations. The method 140 may be performed by the apparatus 100.

The steps 122 to 128 in the method 140 may be the same as in the method 120. In the step 122, data (e.g., a frame) may be stored in the circuit 102. The data may be transferred (e.g., read) from the circuit 102 to the circuit 104 in the step 124. The transfer may take place on the bus 108. Step 124 may form a part of a single DMA transfer operation. In the step 126, the circuit 104 may transfer (e.g., write) the data to the circuit 106 via the bus 110. The circuit 106 may store the data in the step 128 at a given location. The transfer of step 126 and storage of step 128 may also form parts of the single DMA transfer operation.

In the step 142, the circuit 104 may process the data as received from the circuit 102. The processing may include, but is not limited to, decimating, interpolating, filtering and/or deinterlacing. Step 142 may be performed in parallel to steps 126 and 128. In the step 144, the processed data may be transferred from the circuit 104 to the circuit 106 via the bus 110. The circuit 106 may store the processed data in the step 146 at another location, different from the location used in the step 128. Although the method 140 illustrates two destinations for the data in the circuit 106, other embodiments may write the data to three or more destinations using the same technique.

As illustrated in the methods 120 and 140, the circuit 100 generally has a capability to receive and operate on a source location and several destination locations. Writing to the several destination locations may be performed using one or more transfer techniques, depending on the capabilities of the circuit 106. The transfer techniques may include, but are not limited to, sequential, parallel, interleaved and/or alternating transfers. For example, where the circuit 106 has a single data port, the circuit 104 may perform multiple sequential transfers through the data port to write the data to multiple locations (or addresses). Where the circuit 106 is implemented as a multiport device, the circuit 104 may transfer multi-destination data in parallel to respective multiple ports. The data may be multiple copies of the same data or a copy of the data and a copy of processed data. In either situation, a frame or other block of data may be read once from a single location in the circuit 102 and written into the circuit 106 at multiple locations. Thus, the bandwidth utilized on the bus 108 and the circuit 102 may be a single read operation. The bandwidth utilized on the bus 110 and the circuit 106 may be N writes, where N is the number of copies written into the circuit 106.

Furthermore, the apparatus 100 generally avoids the congestion issue and the synchronization issue described for FIG. 2. In particular, the writes (e.g., step 128 and 132) of the data into multiple different areas of the circuit 106 may be performed independently of each other. Furthermore, the write of step 128 into an area of the circuit 106 does not have to be synchronized with a subsequent read from the same area.

Improvements in performance may be created by the processing step 142 of the method 140. By processing the data before writing to the circuit 106, the method 140 generally avoids a subsequent read and a subsequent write to the circuit 106. For example, without the step 142, data written unprocessed to an area of the circuit 106 may be subsequently read from the circuit 106, processed elsewhere (e.g., the circuit 107) and then written back into the circuit 106. Processing elsewhere uses additional bandwidth necessitated by the pre-processing read from the circuit 106 and the post-processing write to the circuit 106. Buffering the unprocessed data in the circuit 106 may also increase the utilized storage capacity of the circuit 106. For example, where the processing is a decimation of the frame, two full frames may be initially stored in the circuit 106. After decimation of a frame copy by half both vertically and horizontally, a quarter-sized frame may be written back into the circuit 106. Therefore, the circuit 106 should be sized to handle the two full frames plus the quarter-size frame. Using the method 140, the data is processed (e.g., decimated) before the initial write into the circuit 106. Therefore, the circuit 106 may be sized to store a full frame and the smaller quarter-sized frame, a savings of three-quarters of a frame. Method 140 may also save processing power of the circuit 107. By performing the initial processing in the circuit 106, the processed data may be readily available to the circuit 107 in a more suitable form.

Figure 6:
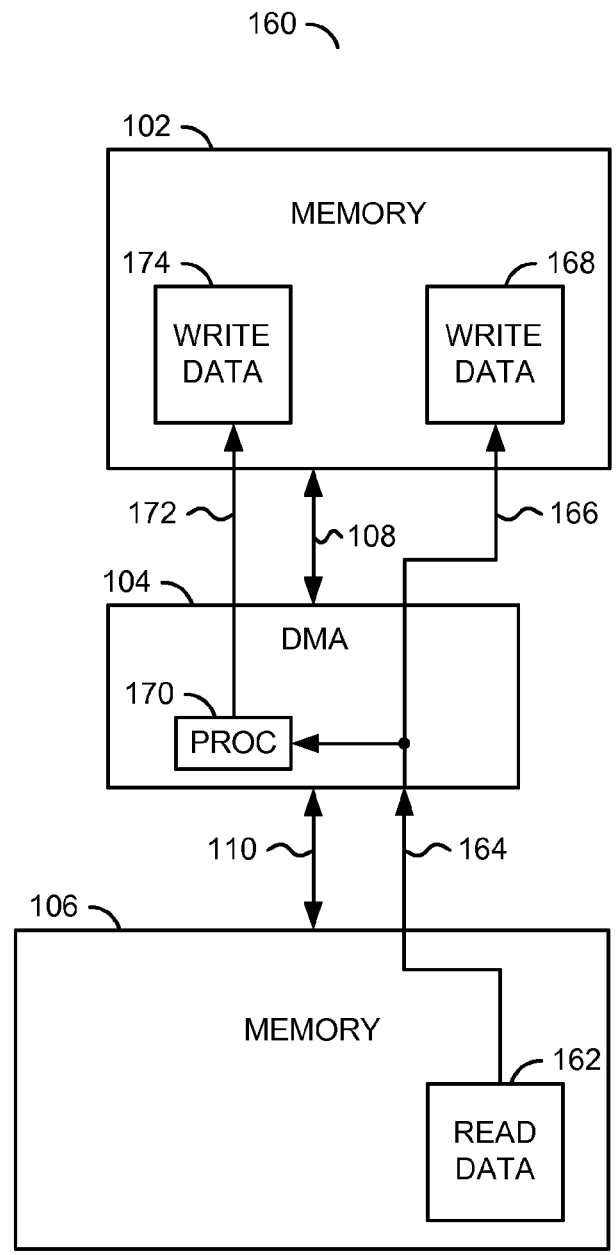
FIG. 6 is a functional flow diagram of another example method for a multi-destination transfer.

Referring to FIG. 6, a functional flow diagram of an example method 160 for a multi-destination transfer is shown. The method (or process) 160 generally comprises a step (or operation) 162, a step (or operation) 164, a step (or operation) 166, a step (or operation) 168, a step (or operation) 170, a step (or operation) 172 and a step (or operation) 174. The steps 162 to 174 may represent modules and/or blocks that may be implemented as hardware, firmware, software, a combination of hardware, firmware and/or software, or other implementations. The method 160 may be performed by the apparatus 100.

In the step 162, data may be stored in the circuit 106. The data may be transferred (e.g., read) from the circuit 106 to the circuit 104 in the step 164. The transfer may take place on the bus 110. Step 164 may form a part of a single DMA transfer operation. In the step 166, the circuit 104 may transfer (e.g., write) the data to the circuit 102 via the bus 108. The circuit 102 may store the data in the step 168 at a given location. The transfer of step 166 and storage of step 168 may also form parts of the single DMA transfer operation. Within the circuit 104, the data may undergo optional processing in the step 170. The processed data may be transferred (e.g., write) from the circuit 104 to the circuit 102 in the step 172. The transfer of step 172 may also take place on the bus 108. In the step 174, the data may be stored in the circuit 102 at another location. The transfer of step 172 and the storage of step 174 may form parts of the single DMA transfer. Although the method 160 illustrates two destinations for the data in the circuit 102, other embodiments may write the data to three or more destinations using the same technique.

The architecture of the apparatus 100 generally improves memory bandwidth utilization problems commonly found in video processing, 3D graphics and other high memory bandwidth applications. The methods 120, 140 and/or 160 generally result in better bandwidth utilization of the circuit 102, the circuit 106, the bus 108 and the bus 110 than existing methods. The methods 120, 140 and/or 160 generally do not suffer from the congestion problem and synchronization problem associated with the method 30. Establishing multiple resolution versions of a frame in the circuit 106 as part of a single DMA transfer operation has an advantage. For example, the creation of downscaled versions of the frame saves the circuit 107 from reading from the circuit 106, performing the downscaling operation and writing back to the circuit 106.

The methods 120, 140 and/or 160 generally enable efficient memory copying operations for video, graphics and other applications, in which the same content is copied from the source circuit to multiple locations in the destination circuit and/or at multiple resolutions. The multi-resolution and/or multi-location copy operations may be performed by a circuit 104 having a design optimized for the particular application(s).

The apparatus 100 generally reads data from a source and stores the data into several destinations. Decimation, interpolation, filtering, deinterlacing and/or other processing techniques may be applied to one or more of the copies during the DMA transfer operation. Therefore, the apparatus 100 generally lowers the bandwidth utilization of both the circuits 102 and 106, does not suffer from the congestion problems or the synchronization problems. The apparatus 100 may also free the circuit 107 to perform other useful tasks by performing initial processing of one or more of the copies.

The functions performed by the diagrams of FIGS. 4-6 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

As would be apparent to those skilled in the relevant art(s), the signals illustrated in FIGS. 3-6 represent logical data flows. The logical data flows are generally representative of physical data transferred between the respective blocks by, for example, address, data, and control signals and/or busses. The system represented by the circuit 100 may be implemented in hardware, software or a combination of hardware and software according to the teachings of the present disclosure, as would be apparent to those skilled in the relevant art(s).

While the invention has been particularly shown and described with reference to the preferred embodiments thereof, it will be understood by those skilled in the art that various changes in form and details may be made without departing from the scope of the invention.

The invention claimed is:

1. An apparatus comprising:
an internal memory; and
a direct memory access controller configured to (i) read first information from an external memory, (ii) generate second information by processing said first information, (iii) write said first information to a first location in said internal memory during a direct memory access transfer and (iv) write said second information across said internal bus to a second location in said internal memory during said direct memory access transfer, wherein (i) said second location is different from said first location, (ii) said second information is a modified version of said first information and (iii) said processing includes filtering said first information.

2. The apparatus according to claim 1, wherein said external memory is outside said apparatus.

3. The apparatus according to claim 1, wherein said processing further includes decimating said first information.

4. The apparatus according to claim 1, wherein said processing further includes deinterlacing said first information.

5. The apparatus according to claim 1, wherein said processing further includes interpolating said first information.

6. The apparatus according to claim 1, wherein said first information is written to said internal memory during said generating of said second information.

7. The apparatus according to claim 1, wherein (i) said direct memory access transfer comprises a plurality of reads from said external memory and (ii) said second information is written after said writing of said first information into said internal memory is complete.

8. The apparatus according to claim 1, wherein said direct memory access controller is further configured to (i) read said first information from said internal memory as part of a second direct memory access transfer and (ii) write said first information to said external memory as part of said second direct memory access transfer.

9. The apparatus according to claim 8, wherein said direct memory access controller is further configured to (i) generate third information by processing said first information as read from said internal memory and (ii) write said third information to said external memory as part of said second direct memory access transfer.

10. The apparatus according to claim 1, wherein said apparatus is implemented as at least one integrated circuit.

11. A method for a direct memory access transfer, comprising the steps of:
   (A) reading first information from an external memory to a direct memory access controller;
   (B) generating second information by processing said first information in said direct memory access controller, wherein (i) said second information is a modified version of said first information and (ii) said processing includes filtering said first information;
   (C) writing said first information to a first location in an internal memory during said direct memory access transfer; and
   (D) writing said second information across said internal bus to a second location in said internal memory during said direct memory access transfer, wherein said second location is different from said first location.

12. The method according to claim 11, wherein said external memory is outside an apparatus comprising said direct memory access controller and said internal memory.

13. The method according to claim 11, wherein said processing further includes decimating said first information.

14. The method according to claim 11, wherein said processing further includes deinterlacing said first information.

15. The method according to claim 11, wherein said processing further includes interpolating said first information.

16. The method according to claim 11, wherein said first information is written to said internal memory during said generating of said second information.

17. The method according to claim 11, wherein (i) said direct memory access transfer comprises a plurality of reads from said external memory and (ii) said second information is written after said writing of said first information into said internal memory is complete.

18. The method according to claim 11, further comprising the steps of:
   reading said first information from said internal memory as part of a second direct memory access transfer; and
   writing said first information to said external memory as part of said second direct memory access transfer.

19. The method according to claim 18, further comprising the steps of:
   generating third information by processing said first information as read from said internal memory; and
   writing said third information to said external memory as part of said second direct memory access transfer.

20. An apparatus comprising
   means for reading first information from an external memory;
   means for generating second information by processing said first information, wherein (i) said second information is a modified version of said first information and (ii) said processing include filtering said first information;
   means for writing said first information to a first location in an internal memory during a direct memory access transfer; and
   means for writing said second information across said internal bus to a second location in said internal memory during said direct memory access transfer, wherein said second location is different from said first location.

* * * * *